US007204910B2

(12) United States Patent
Foubert et al.

(10) Patent No.: US 7,204,910 B2
(45) Date of Patent: Apr. 17, 2007

(54) FILM TAPE FOR FORMING A CUTTING EDGE ON DISPENSER CARTONS

(75) Inventors: Roland A. Foubert, Vancouver, WA (US); Wieslaw A. Drapala, Vancouver, WA (US); Kimberly J. Williams, Vancouver, WA (US); Richard G. Catterlin, Vancouver, WA (US)

(73) Assignee: Adalis Corporation, Vancouver, WA (US)

( * ) Notice: Subject to any disclaimer, the term of this patent is extended or adjusted under 35 U.S.C. 154(b) by 10 days.

(21) Appl. No.: 10/783,220

(22) Filed: Feb. 19, 2004

(65) Prior Publication Data

US 2004/0164116 A1    Aug. 26, 2004

Related U.S. Application Data

(60) Division of application No. 09/736,512, filed on Dec. 13, 2000, now abandoned, which is a continuation of application No. 09/154,005, filed on Sep. 16, 1998, now abandoned.

(51) Int. Cl.
*B32B 37/00* (2006.01)
*B31B 17/14* (2006.01)

(52) U.S. Cl. ............... 156/271; 156/259; 156/516; 156/517; 156/327; 156/556; 493/86; 493/378

(58) Field of Classification Search ........... 156/249, 156/251, 261, 264, 269, 515, 522, 530, 259, 156/271, 516, 517, 327, 556; 493/86, 378
See application file for complete search history.

(56) References Cited

U.S. PATENT DOCUMENTS

| | | | |
|---|---|---|---|
| 1,843,429 A | 2/1932 | Marcalus | |
| 2,628,179 A | 2/1953 | Bergstein | |
| 3,142,426 A | 7/1964 | Busse | |
| 3,698,548 A | 10/1972 | Stenzel et al. | |
| 3,729,648 A * | 4/1973 | Kerr | 361/213 |
| 3,886,033 A | 5/1975 | MacDonald et al. | |
| 3,933,288 A | 1/1976 | Struble | |
| 3,968,548 A | 7/1976 | Clark et al. | |
| 3,986,440 A * | 10/1976 | Macdonald et al. | 493/6 |
| 3,992,244 A | 11/1976 | Craig et al. | |
| 4,253,837 A | 3/1981 | Taddei | |
| 4,346,830 A | 8/1982 | Hauser | |
| 4,399,935 A | 8/1983 | Nelder | |
| 4,580,709 A | 4/1986 | Roccaforte | |
| 4,637,514 A | 1/1987 | Kildea et al. | |
| 4,676,861 A | 6/1987 | Bishop | |
| 4,722,489 A | 2/1988 | Wommer | |

(Continued)

FOREIGN PATENT DOCUMENTS

DE    29 30 725 A1    2/1981

(Continued)

*Primary Examiner*—Linda Gray
(74) *Attorney, Agent, or Firm*—Klarquist Sparkman, LLP

(57) ABSTRACT

A tape formed of a polymeric material and having a thickness and stiffness suitable as a cutting edge on a dispensing carton for convolutely wound foil, film or paper, the tape includes a coating of adhesive and is applied at a laminating station in the carton manufacturing process and is generally cut with the forming of the carton blanks, and the cut in the tape may be formed with a serrated edge.

14 Claims, 3 Drawing Sheets

U.S. PATENT DOCUMENTS

| | | |
|---|---|---|
| 5,173,141 A | 12/1992 | Leseman et al. |
| 5,186,376 A | 2/1993 | Scharf et al. |
| 5,213,245 A | 5/1993 | Puaatuua |
| 5,363,997 A | 11/1994 | Harris |
| 5,423,464 A | 6/1995 | Yuki et al. |
| 5,501,763 A | 3/1996 | Ueda et al. |
| 5,654,055 A | 8/1997 | Cox et al. |
| 5,866,221 A | 2/1999 | Owen et al. |
| 5,897,736 A | 4/1999 | Kawai et al. |
| 6,013,148 A | 1/2000 | Bluemle |
| 6,173,876 B1 * | 1/2001 | Sano et al. .................. 225/39 |
| 6,325,128 B1 | 12/2001 | Owen et al. |
| 6,375,058 B1 | 4/2002 | Passamoni |
| 6,405,913 B1 | 6/2002 | Passamoni |
| 6,422,283 B1 * | 7/2002 | Okushita et al. ............ 156/521 |
| 6,491,198 B1 | 12/2002 | Frank |
| 6,568,449 B2 | 5/2003 | Owen et al. |
| 2001/0000902 A1 | 5/2001 | Foubert et al. |
| 2003/0091779 A1 | 5/2003 | Brewster |

FOREIGN PATENT DOCUMENTS

| | | |
|---|---|---|
| EP | 603 398 A1 | 6/1994 |
| EP | 0 776 848 A2 | 11/1996 |
| EP | 0776848 A2 * | 6/1997 |
| GB | 2 315 041 | 1/1998 |
| GB | 2315041 A * | 1/1998 |
| WO | WO 00/15729 | 3/2000 |

* cited by examiner

FILM TAPE FOR FORMING A CUTTING EDGE ON DISPENSER CARTONS

This is a divisional of U.S. application Ser. No. 09/736,512 filed Dec. 13, 2000, now abandoned which is a continuation of U.S. application Ser. No. 09/154,005 filed Sep. 16, 1998, now abandoned.

BACKGROUND OF THE INVENTION

1. Field of the Invention

This invention relates to a novel tape for forming a cutting edge on cartons or boxes for convolutely wound rolls of film, paper or foil products, and in one aspect to a new method for applying a cutting edge in-line with the printing or sheeting station of the carton manufacturing machine. The cutting edge is formed of a polymeric material adhered to the carton for cutting lengths of material from a roll in the carton.

2. Description of the Prior Art

The prior art is replete with teachings of using a rectangular dispensing carton for a roll of sheet material, which material is intended to be dispensed and severed in the desired length from the carton by the consumer. The cartons generally have a cutter on an edge of the front panel or on the lid to aid in cutting the material. The cutter is formed with a saw-toothed edge to guide the cut across the width of the sheet material.

The saw-toothed or serrated cutting edge has been typically formed of a metal (EP 352634 A dated Jan. 1,1990, U.S. Pat. No. 5,078,311) or from the carton paper or board impregnated with resin (WO 9635574 A2), or by reinforcing a paper carton with plastic or vulcanized fiber materials with an ultrasonic fusion member (JP 8309890 A dated May 22, 1995). U.S. Pat. No. 4,405,066 discloses a flip top dispenser carton of the type related to the present invention wherein the invention relates to the flaps forming the ends of the carton. It also teaches that the longitudinally extending free edge of the outer panel is straight and is provided with a plastic reinforcing strip. The patent teaches the combination of a straight edge 40 and the reinforcing strip 42 provides a rigid cutting surface for tearing heavier rolls of film such as wax paper and aluminum foil. The reinforcing plastic is applied to adjacent blanks which are contiguous, such that a single cut, defining the free edges of both blanks simultaneously forms the side edges of both plastic strips, producing a cutting edge at lower cost than the metal saw-tooth blades.

The present invention differs from the prior art in that the present invention compares a film tape coated with an adhesive for continuous application to a carton fiber board or to the blank to form a resulting reinforced cutting edge on the lid flap or front panel of a carton. The tape is applied to the carton board during the normal box making process. The tape is formed of a polymeric material which is strong enough to serve the numerous cutting operations on the material dispensed from the ultimate carton but not as sharp or likely to cause injury to the consumer as the current methods.

SUMMARY OF THE INVENTION

The present invention provides a new film tape coated with adhesive for application to the carton board of a carton for a convolutely wound roll of sheet material in which the tape serves as the cutting edge on the carton for the material. The tape is formed of a polymeric film material in a continuous strip which is stiff enough, when applied to the free edge of a carton to provide the cutting function. The exposed edge may be a straight or a serrated edge. Further, the tape of the present invention reduces the number of stations used in the carton forming machine to apply the cutting edge. The application of a metal cutting edge requires the application station and a station for riveting or stapling the metal to the blank. The method of the present invention requires a laminating step or station inline with the printing or sheeting station to apply the tape before the blanks are cut or separated. If the tape is applied to blanks placed in mirror-image to each other, the tape is applied to both blanks simultaneously and the tape is then cut lengthwise to form the cutting edge on each blank and to separate the blanks.

BRIEF DESCRIPTION OF THE DRAWING

The present invention will be further described with reference to the accompanying drawing wherein.

DESCRIPTION OF THE PREFERRED EMBODIMENT

Figure 1:
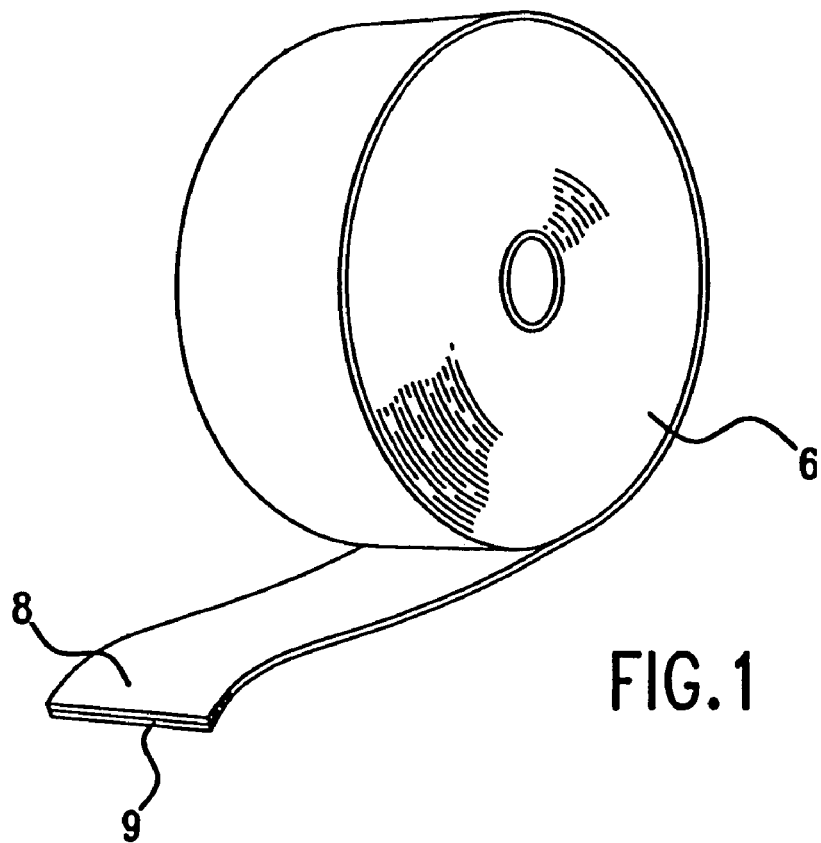
FIG. 1 is a perspective view of a roll of the tape material of the present invention.

The present invention provides a polymeric tape for forming the cutting edge on a rectangular dispensing carton or box for polymeric wrapping film waxed or other paper, or metal wrapping foil.

Referring now to the drawing, the tape 6 comprises a polymeric backing 8 coated with an adhesive 9, preferably a hot melt adhesive. The tape 6 is transversely or convolutely wound to provide a continuous supply of tape to a carton making machine such that it can be applied in-line at a laminating station. The laminating station is in-line with the printing or sheeting station of the carton forming machine.

Figure 2:
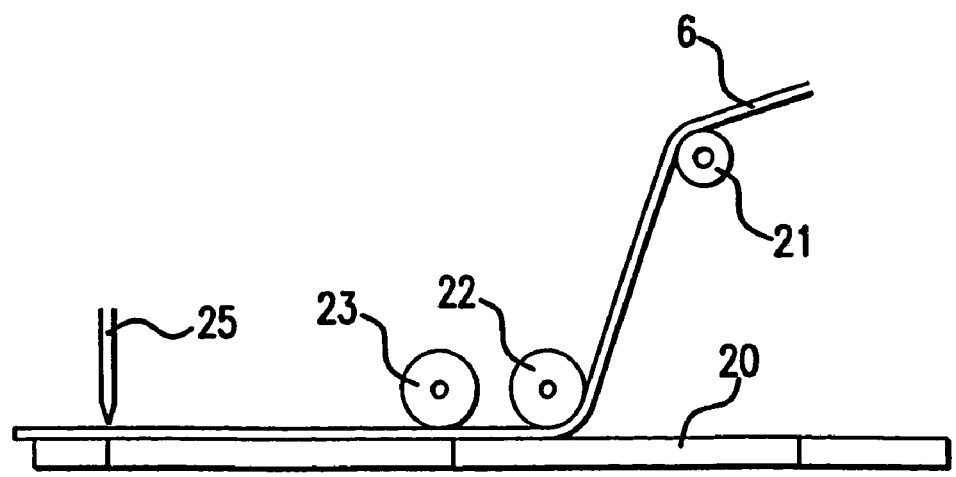
FIG. 2 is a schematic view of the application of the tape to a sheet of fiber board moving through the box forming machine.
Figure 3:
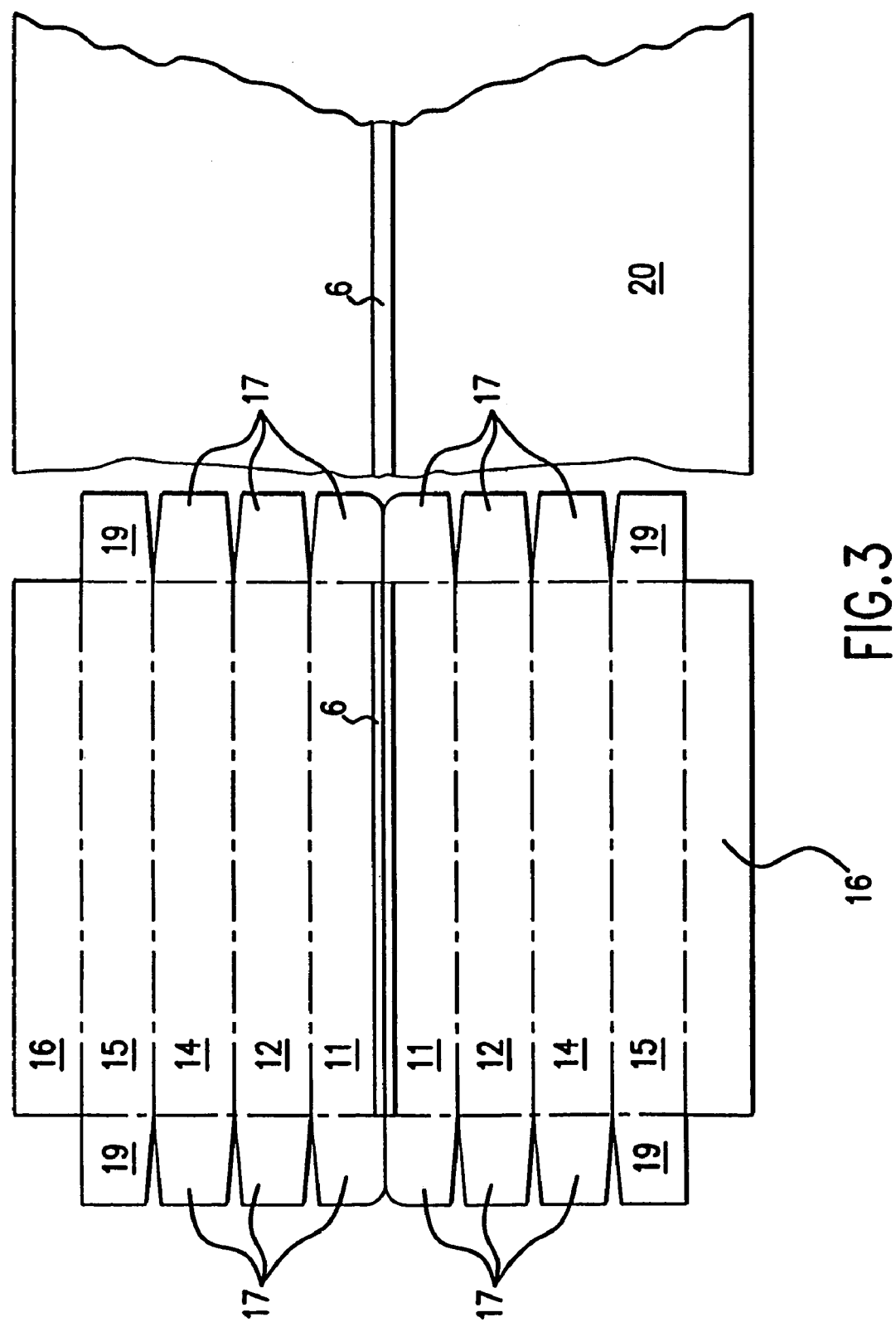
FIG. 3 is a plan schematic view of the tape applied to the fiber board arid then cut into mirrored pairs of box blanks with the tape applied and cut on center to separate the box blanks before the folding station.
Figure 4:
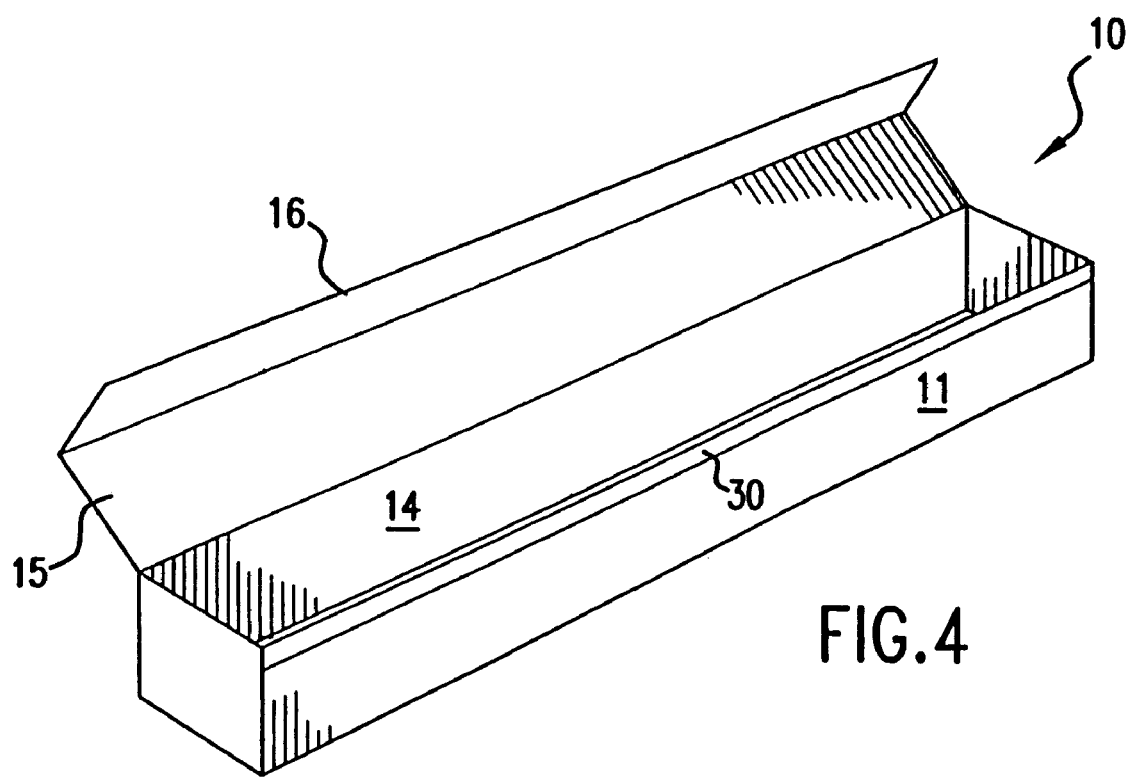
FIG. 4 is a perspective view of a dispenser carton showing the cutting tape applied along the top edge of the front panel forming the cutting edge.

FIG. 2 schematically illustrates the application of the tape 6 to a carton board 20 as it is advanced through the carton manufacturing machine in the machine direction The tape 6 passes over a feed or idler roller 21 to an applying roller 22 and under a pressure or laminating roller 23. One or both of the rollers 22 and 23 can be heated to apply a tape 6 coated with a hot melt adhesive 9. Beyond the laminating station is the die cutting station 25 which die cuts the carton blanks from the carton board 20 and cuts the tape 6 to length on the blank and down the middle to separate two carton blanks, see FIG. 3.

The carton 10 normally includes a front panel 11, a bottom panel 12, a rear panel 14, and a lid 15, which is hingedly joined to the rear panel 14, and a closing flap 16, joined. to the free edge of the lid 15, to cover a portion of the front panel 11. Flanges 17 on the ends of the front, bottom and rear panels form the ends 18 of the carton 10, and as illustrated the lid 15 can be formed with a flange 19, which is torn away from the ends of the lid 15 upon opening the carton 10. The carton 10 is rectangular, having a length considerably greater than its width to support a roll of sheet material, i.e., clingfilm, paper or foil, not shown. Typically a cutter blade is riveted to the upper edge of the front panel 11 or to the free edge of the closing flap 16. In the present invention the cutter bar 30 is formed by the polymeric tape 6 bonded to the upper free edge of the front panel 11. The cutter bar 30 has a straight edge projecting just above but generally parallel with the top edge of the front panel over which the material is drawn and then torn across the cutter edge. The tape forming the cutter bar can also be cut so as to form a saw-toothed or serrated free edge to aid in cutting the sheet material.

Figure 5:
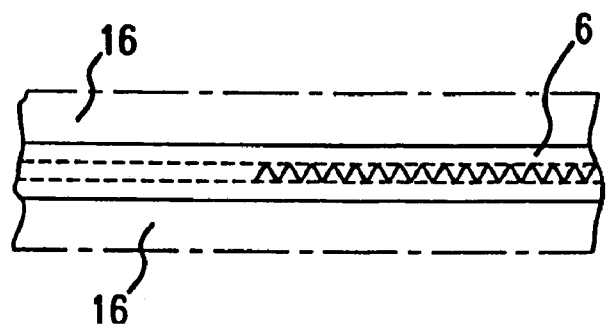
FIG. 5 is a detail view showing the tape applied to two carton blanks and cut to form a saw-tooth or serrated edge.

As shown in schematic form in FIG. 5, the tape is applied to blanks in contiguous manner, but spaced between the adjacent edges formed to support the cutting bar 30. When the tape is applied to the two moving blanks it is registered with the moving blanks and laminated as explained above. The tape is then cut and in this manner it can be cut to project just above the edge of the front panel 11 or the flap 16 on the lid. As illustrated the tape is cut to have a saw-toothed edge. Alternatively, the tape 6 can be formed to be applied to individual blanks and formed with a straight or serrated edge.

In the present invention, the tape 6 comprises a film backing 8 and an adhesive 9. The film backing is formed of polyester, polypropylene, polyethylene or similar polymeric material having sufficient strength to support the cutting function, and preferably polyester. The backing is heat resistant between about 160° F. (71° C.) and about 350° F. (177° C.), preferably at least 250° F. (125° C.). The backing 8 has a thickness between 2 mils (0.05 mm) and 7 mils (0.18 mm), preferably 4 mils (0.1 mm), with a width of 0.25 inch (0.60 cm) to 1.25 inches (3.2 cm), and preferably the cutting edge on the carton is 0.25 inch (0.60 cm) in width. If the tape is applied to blanks placed in mirror images to each other, a wider tape is preferred, preferably twice as wide as that used as the cutting edge on each blank.

The adhesive 9 exhibits high adhesion characteristics to the film backing and the carton board such that it maintains a good bond under the normal wear and tear exerted on the carton. A preferred adhesive formulation is:

| Wt-% | Material | Available From |
|---|---|---|
| 20.0 | AC 830 | Allied Signal, Inc., Morristown, NJ |
| 4.0 | Be Square 195 | Bareco Products, Rock Hill, SC |
| 28.0 | Unitac R99 | Union Camp Corporation, Jacksonville, FL |
| 12.0 | Norsolene A110 | Sartomer Company, Exton, PA |
| 0.50 | Lenox 10 | Alphachem International Corp., Lake Oswego, Or. |
| 10.0 | AT2820 | AT Plastics Edmonton, Alberta Canada |
| 25.5 | Elvaloy HP771 | Dupont, Wilmington, DE |

Alternatively, for a properly treated film, the adhesive 9 can be any available hot melt adhesive that exhibits high adhesion characteristics to carton board. When other hot melt adhesives are used, the tape backing is preferably corona treated to improve adhesion of the adhesive to the backing. Other means of improving the adhesion can also be used, such as treating the backing with adhesion promoters.

Available hot melts for the adhesive 9 can be any typical hot melt adhesive or hot melt pressure-sensitive adhesive such as an ethylene-vinyl acetate copolymer (EVA-based) hot melt adhesive; a metallocene based hot melt pressure-sensitive adhesive such as those comprising at least one homogeneous linear or substantially linear interpolymer of ethylene and at least one $C_2$ to $C_{20}$ alpha-olefin; EMA-based hot melt and hot melt pressure sensitive adhesive (ethylene methylacrylate); EnBA-based hot melt adhesive (ethylene n-butyl acrylate); hot melt adhesives based on polyethylene and polypropylene homopolymers, copolymers and interpolymers, or rubbery block copolymer hot melt adhesives. In general, if EVA-based hot melt adhesives are used, they typically comprise about 15% to about 40% EVA, about 10% to about 35% wax, about 20% to about 40% resin, and about 0.2% to about 0.4% anti-oxidant. These adhesives exhibit high adhesion characteristics to the carton board, and the backings 8 can be treated to improve its adhesion to the adhesives.

It is surprising that even though the tape is relatively thin, it performs as a very good cutting edge, especially when the tape projects just above the panel.

The tape is used in the carton manufacturing process to be applied to the carton material as the sane moves through the carton forming machine in the machine direction. The tape is applied at one station in the process to laminate the adhesive coated surface against the carton board and is then cut to form a cutting edge along the edge of the front panel or the closing flap on the lid. The tape may be cut to form a straight edge or a serrated edge. Alternatively, the tape is cut to form serrations along one edge during the manufacture of the rolls of tape. The application of the cutting edge tape takes place at one station and after a registered amount of tape is dispensed, registered and laminated to the carton board adjacent the edge of the carton board forming the free upper edge of the front panel, it is cut from the roll.

For the embodiment where the cutting edge extends beyond the edge of the front panel of the carton, whether the edge is straight or serrated, the adhesive is coated on the backing such that the exposed edge is free of adhesive, if the adhesive used is pressure-sensitive. If the adhesive us becomes cured after application, then the adhesive can be present on the exposed edge as well.

The adhesive thickness ranges from a coating weight of about 3 to about 10 g/sq ft (g/929 $cm^2$), preferably of about 3.3 to about 4 g/sq ft. (g/929 $cm^2$).

An alternative way of using the tape to form a cutting mechanism is to apply the tape to carton board that will be cut into a single rectangular shape that can act as an insert into the box that holds the roll of film to be cut. A wide tape can be used so that the inserts can be made in a mirror image and the tape can be cut down the center with ½ ending up on each insert. The top edge of the insert can be either a straight edge or a serrated pattern. Alternatively the tape can be applied along the edge of the carton board so that it extends above the edge of the carton board when the insert is cut out, providing a sharper surface against which to tear the film to be cut.

Inserts produced in the method described above can be inserted as cutting mechanisms into dispensing cartons made of carton board or larger institutional dispensing boxes made of corrugated.

When the tape is used in a fashion such that it extends above the edge of the carton board, the tape can be manufactured so that only ½ of the surface is coated with adhesive. This would assure that the surface of tape that extends above the carton board is free of adhesive on both sides.

Having disclosed the present invention and equivalents thereof, it is to be understood that other changes can be made therein without departing from the spirit and scope of the invention claimed in the appended claims.

The invention claimed is:

1. A method of forming a cutting edge on a dispensing carton for film, foil, or paper, the method comprising:
   supplying a roll of tape to an application station, the tape having a polymeric backing coated with an adhesive on one side;
   applying a length of the tape to a length of carton board and laminating the tape to the carton board; and
   cutting the carton board and tape lengthwise to separate the carton board into carton blanks and form a cutting edge on each carton blank;
   wherein the adhesive is a hot melt adhesive;
   wherein the tape is applied to the carton board with one or more heated rollers.

2. The method according to claim 1, wherein the cutting of the carton board and the tape forms a serrated edge in the tape and along the cutting edge of each carton blank.

3. The method according to claim 1, wherein the carton blank comprises a front panel, a bottom panel, a rear panel, and a lid.

4. The method according to claim 3, wherein the cutting edge is formed on the front panel.

5. The method according to claim 1, wherein the tape comprises a backing formed of a polymeric material selected from the group consisting of polyester, polyethylene and polypropylene.

6. The method according to claim 3, wherein the carton board and tape are cut simultaneously such that (i) the tape and (ii) the front panel or lid each have a matching profile that together form the cutting edge.

7. The method according to claim 1, wherein the tape is applied in registry with preformed adjacent edges of the carton blanks cut from the carton board.

8. The method according to claim 1, wherein the roll of tape is preformed with the adhesive coated on one side of the polymeric backing.

9. The method according to claim 1, wherein the backing has a thickness between about 2 mils (0.05 mm) to about 7 mils (0.18 mm).

10. The method according to claim 1, wherein the backing is corona treated.

11. The method according to claim 1, wherein the backing is heat resistant between about 160° F. (71° C.) and about 350° F. (177° C.).

12. A method of forming a cutting edge on a dispensing carton for film, foil, or paper, the method comprising:
   supplying a roll of tape to an application station, the tape having a polymeric backing coated with an adhesive on one side;
   applying a length of the tape to a length of carton board and laminating the tape to the carton board; and
   cutting the carton board into at least one carton blank; and
   cutting the tape lengthwise to form a cutting edge on the al least one carton blank;
   wherein the at least one carton blank comprises a front panel, a bottom panel, a rear panel, and a lid;
   wherein the cutting edge is formed on the front panel;
   wherein the cutting edge projects above the edge of the front panel.

13. The method according to claim 12, wherein the portion of the cutting edge projecting above the edge of the front panel is free of the adhesive.

14. The method according to claim 1, wherein the act of cutting the carton board and tape comprises simultaneously cutting the carton board and tape lengthwise to separate the carton board into separate carton blanks with a cutting edge on each carton blank.

* * * * *

UNITED STATES PATENT AND TRADEMARK OFFICE
CERTIFICATE OF CORRECTION

PATENT NO. : 7,204,910 B2
APPLICATION NO. : 10/783220
DATED : April 17, 2007
INVENTOR(S) : Foubert et al.

It is certified that error appears in the above-identified patent and that said Letters Patent is hereby corrected as shown below:

Column 2, line 27, replace "arid then" with --and then--.

Column 2, line 41, replace "film waxed" with --film, waxed--.

Column 2, line 52, replace "direction The" with --direction. The--.

Column 2, line 64, replace "joined. to" with --joined to--.

Column 4, line 3, replace "$C_2$" with --$C_3$--.

Column 4, line 20, replace "sane moves" with --same moves--.

Column 6, line 21, replace "the al least" with --the at least--.

Signed and Sealed this

Seventeenth Day of June, 2008

JON W. DUDAS
*Director of the United States Patent and Trademark Office*